United States Patent [19]

Kramer et al.

[11] 4,359,199
[45] Nov. 16, 1982

[54] SOFT LANDING GEAR

[75] Inventors: Louis T. Kramer; Franklin H. Butler, both of Long Beach; Anthony V. Camino, Rancho Palos Verdes, all of Calif.

[73] Assignee: The United States of America as represented by the Secretary of the Air Force, Washington, D.C.

[21] Appl. No.: 100,321

[22] Filed: Dec. 5, 1979

[51] Int. Cl.³ .............................................. B64C 25/40
[52] U.S. Cl. ............................. 244/100 R; 244/104 R
[58] Field of Search ......... 244/100 R, 102 R, 102 SS, 244/102 SL, 103 S, 104 R, 104 FP

[56] References Cited

U.S. PATENT DOCUMENTS

| 2,811,326 | 10/1957 | Westcott, Jr. | 244/102 R |
| 2,958,400 | 11/1960 | Gilbert | 244/104 R X |
| 3,195,840 | 7/1965 | Tollar | 244/102 R |
| 3,652,040 | 3/1972 | Hartel | 244/104 R |
| 3,784,131 | 1/1974 | Stratford | 244/102 R |

FOREIGN PATENT DOCUMENTS 663245 12/1951 United Kingdom ............ 244/102 R

OTHER PUBLICATIONS

Conway, *Landing Gear Design*, Chapman & Hall Ltd. (London), 1958, pp. 115-124.

Primary Examiner—Galen L. Barefoot
Attorney, Agent, or Firm—Donald J. Singer; Arsen Tashjian

[57] ABSTRACT

A bogie type landing gear especially suitable for providing soft landing capabilities for short take-off and landing (STOL) aircraft wherein fore and aft wheels are mounted on opposite ends of a bogie which is pivotally attached to the lower end of a vertical shock strut. In one embodiment, a torque link pivotally connects the aft end of the bogie to the shock strut such that, under normal landing conditions, the front wheel will touch down first thereby reducing and directing the landing forces to minimize shock to the aircraft. The aft mounted torque links also act as a tension member during the initial landing stroke. In another embodiment, a damper acts as a tension stop for a soft landing arrangement as well as to dampen bogie motion over bumps with the torque links being separate.

2 Claims, 4 Drawing Figures

SOFT LANDING GEAR

STATEMENT OF GOVERNMENT INTEREST

The invention described herein may be manufactured and used by or for the Government for governmental purposes without the payment of any royalty thereon.

BACKGROUND OF THE INVENTION

This invention relates to a bogie type landing gear and, more particularly, the invention is concerned with providing a soft landing gear suitable for short take-off and landing (STOL) aircraft wherein short aft mounted torque links operate to pitch the bogie downward causing the front tires to contact the ground first. The resultant landing force combines with tension forces in the torque links to act virtually up the strut, keeping piston bending and strut friction forces to a minimum.

In H. G. Conway's book "Landing Gear Design", page 120, FIG. 112(d), there is shown a bogie type landing gear somewhat similar to this invention. This type of prior art landing gear is suggested for aircraft with long strokes and high sink rates, such as STOL (short take-off and landing). The long stroke gears are normally subjected to increased piston bending and bearing friction during landing. Both of these undesirable conditions tend to obstruct vertical motion of the strut and to induce high vertical and drag loads into the aircraft. In the prior art landing gear (shown in FIG. 1), the tension load in the extension stop is in the same general direction as the resultant of the spin up and vertical loads acting on the aft axle. The drag components acting on the bogie and piston thus add to one another producing even higher piston bending and strut friction.

It would be most advantageous to provide a bogie type landing gear where the piston bending and strut friction forces could be held to a minimum. This could be accomplished by setting up the loading conditions so that the resultant piston force would be straight up the strut with little piston bending and friction. This would reduce the touchdown force required to overcome the extended air pressure and to initiate strut compression. Also, the couple forces on the strut bearings could be practically eliminated during the first portion of strut compression.

SUMMARY OF THE INVENTION

The invention is concerned with providing a bogie type landing gear which is particularly well suited for use on a STOL (short take-off and landing) aircraft. Fore and aft wheels are mounted on opposite ends of a bogie which is pivotally attached to the lower end of a vertical shock strut such that the front wheels touch the ground first. In one embodiment, combined torque and soft landing links are pivotally attached between the aft end of the bogie and the fixed upper portion of the strut. In a second embodiment, the soft landing links are pivotally attached between the aft end of the bogie and the strut while the torque links are pivotally attached between the forward end of the bogie and the strut. In a third embodiment, the torque links are attached as in the second embodiment while and extension stop and damper arrangement is pivotally attached between the aft end of the bogie and the strut. All three embodiments provide for soft landing with minimum jolt especially on STOL aircraft having long strokes and high sink rates.

Accordingly, it is an object of the invention to provide a soft landing gear of the bogie type wherein the landing drag loads in the piston are reduced by not spinning all the wheels on one gear simultaneously and by transferring the spinup reaction of the forward wheels to the cylinder through the aft links and piston axial load instead of through piston bending.

Another object of the invention is to provide a bogie type soft landing gear wherein the slap-down velocity of the second set of tires on an unlevel bogie is reduced by as much as a factor or two.

Still another object of the invention is to provide a soft landing bogie type gear for STOL aircraft wherein an effectively longer stroke from the summation of bogie and strut motions is provided.

A further object of the invention is to provide a soft landing gear wherein the jolt, da/dt, which is often called the onset of acceleration is greatly reduced. This most noticed physical parameter during a sudden deceleration is more noticeable than the acceleration itself.

A still further object of the invention is to provide a bogie type soft landing gear wherein the wheels are caused to touch down firmly thereby preventing lateral skating as can occur when the bogie is free to rotate.

Another still further object of the invention is to provide a bogie type landing gear wherein the static height is raised to provide a softer gear at taxi without increasing the initial touchdown force, which normally occurs with the increased extended strut pressure.

Another still further object of the invention is to provide a bogie type soft landing gear wherein a combination extension stop and damper is substituted for soft landing links thereby improving the rough terrain capability during the taxi mode while still retaining the soft landing characteristics.

These and other objects, features and advantages will become more apparent after considering the following detailed description taken in conjunction with the annexed drawings and appended claims.

DESCRIPTION OF THE PREFERRED EMBODIMENT

Figure 1:
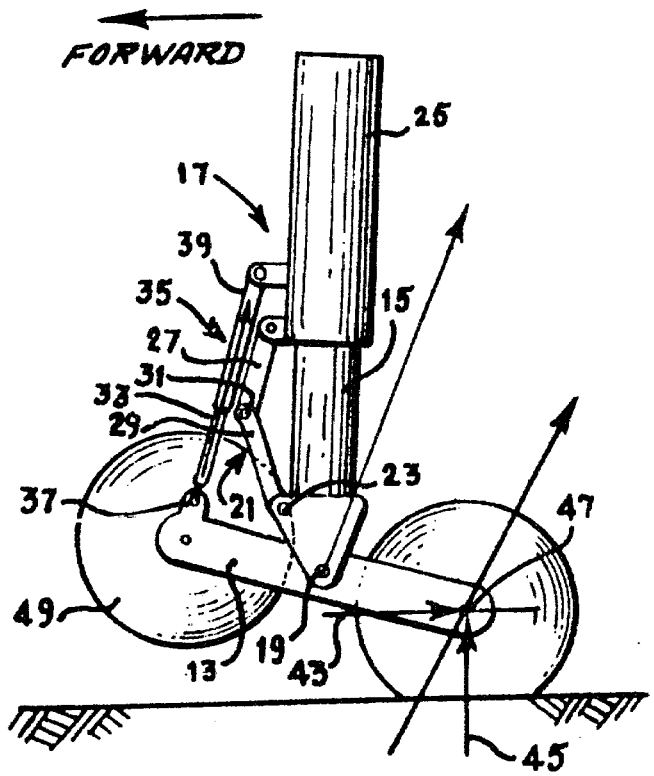
FIG. 1 is a side elevation view of a strut and bogie arrangement of a landing gear used on prior art aircraft showing the torque links and extension stop on the front of the landing gear causing the aft wheel to make initial contact with the ground.

Referring now to the drawings wherein like reference numerals refer to like elements in the several views, FIG. 1 shows a prior art landing gear presently in use on some aircraft. It can be seen that a horizontal bogie 13 is pivotally attached to the lower piston end 15 of the vertical shock strut 17 at the pivot point 19. The lower end of a torque linkage 21 is attached to another pivot point 23 on the lower piston end 15 of the vertical strut 17, with the upper end being attached to the forward side of the upper fixed portion 25 of the strut 17. The torque linkage 21 includes an upper arm 27 and a lower arm 29 which pivots about the point 31. The lower end 33 of an extension stop 35 is pivotally attached to the forward end of the bogie 13 at point 37 while the upper end 39 of the extension stop 35 is attached to the forward side of the upper fixed portion 25 of the strut 17. In the prior art gear shown in FIG. 1, the tension loads on the extension stop 35 is in the same general direction as the resultant of the spin up load 43 and the vertical load 45 acting on the aft axle 47. The drag components acting on the bogie 13 and the piston 15 thus add rather than counteract as in the inventive landing gear shown in FIG. 2.

Figure 2:
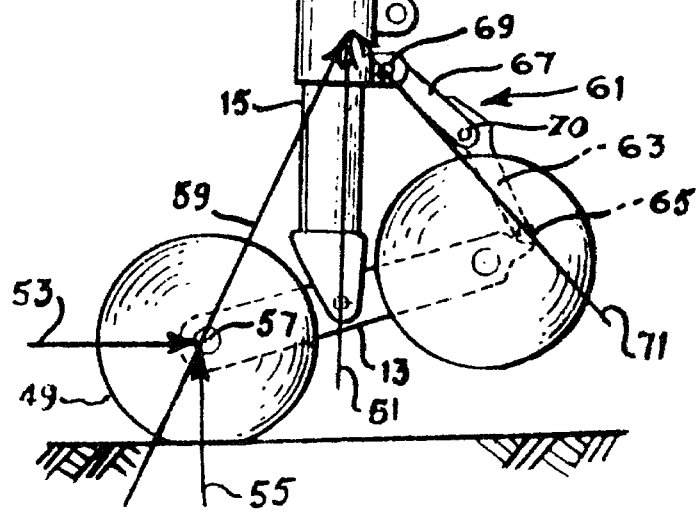
FIG. 2 is a side elevation of a bogie type soft landing gear according to the invention showing the combined torque and soft landing links at the rear of the landing gear causing the forward wheel to make first contact with the ground.

In FIG. 2, the front wheels 49 touch the ground first setting up initial loading conditions where the resultant force 51 is practically straight up the strut 17 with little bending of the piston 15. The spin up load 53 and the vertical load 55 acting on the forward axle 57 produce the resultant force 59. The short aft mounted torque links 61 are pivotally connected to each other at point 70 with the lower link 63 pivotally connected to the aft end of the bogie 13 at point 65 and the upper link 67 pivotally connected to the aft side of the upper fixed portion 25 of the strut 17 at point 69. The tension forces 71 in the torque links 61 combine with the force 59 to produce the resultant force 51 which acts virtually up the strut 17, keeping piston bending and strut friction forces to a minimum.

Figure 3:
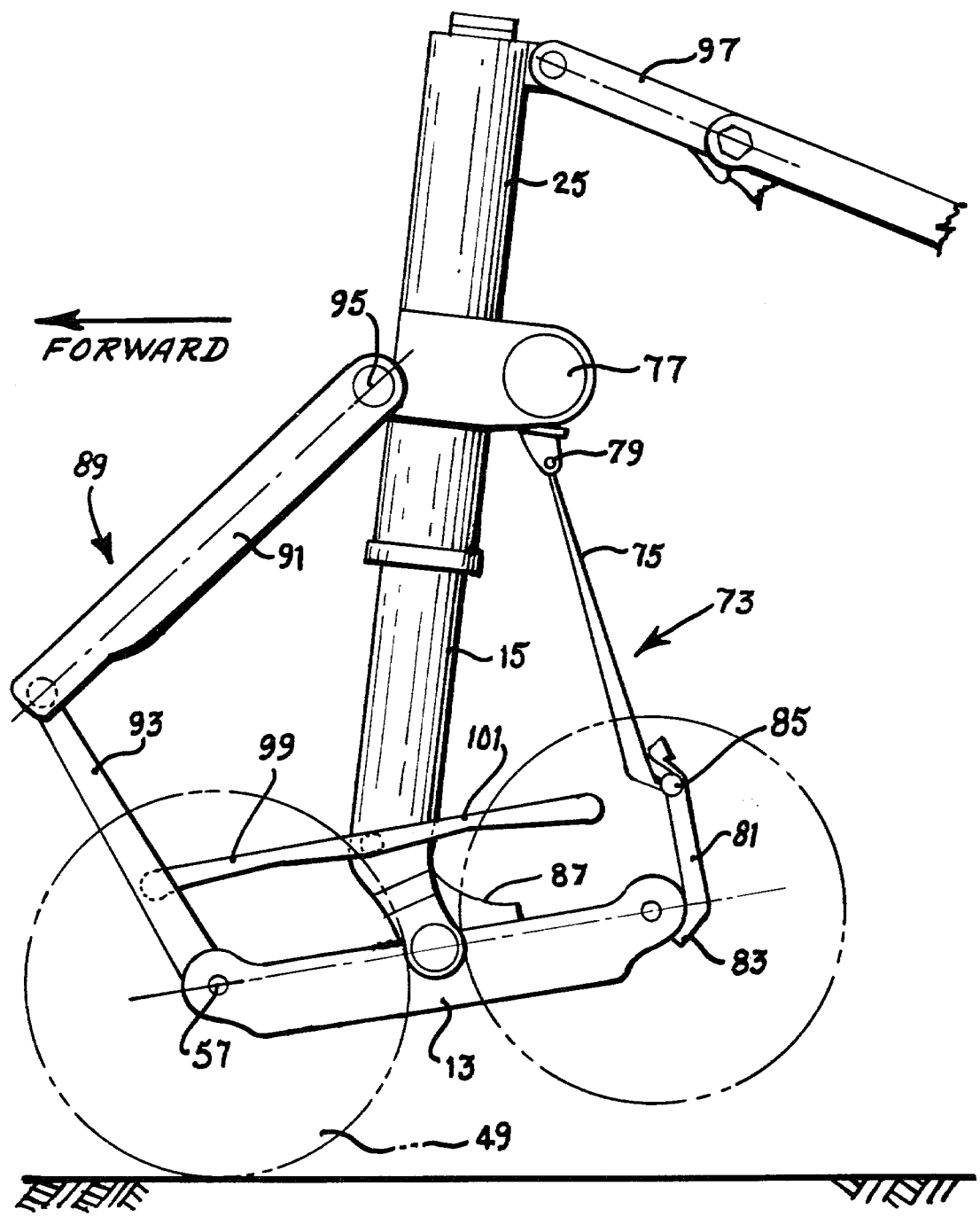
FIG. 3 is an enlarged view of another embodiment of the invention showing the torque links on the front and the soft landing links on the rear of the landing gear.

In FIG. 3, there is shown a soft landing gear especially suitable for a STOL aircraft. The soft landing links 73 are added to a conventional landing gear wherein the upper link 75 is pivotally attached to the trunnion 77 on the shock strut 25 at the point 79 and the lower link 81 is pivotally attached to the aft end of the bogie 13 at the point 83. The lower end of the upper link 75 and the upper end of the lower link 81 are pivotally joined together at point 85. The bogie 13 is positioned for landing between a stop 87 on the piston 15 and the extended soft landing link 73. This bogie 13 position places the forward wheel 49 closest to the ground. A pair of torque links 89 including an upper link 91 and a lower link 93 are attached to the forward area of the landing gear. The lower end of the lower link 93 is pivotally attached to the forward end of the bogie 13 at the front wheel axle 57 and the upper end of the upper link 91 is pivotally attached to the shock strut 25 at the point 95. A drag brace 97 is pivotally attached to the upper end of shock strut 25. The brake rods 99 and 101 are pivotally attached to the piston 15 and to the forward and aft wheel brakes.

Figure 4:
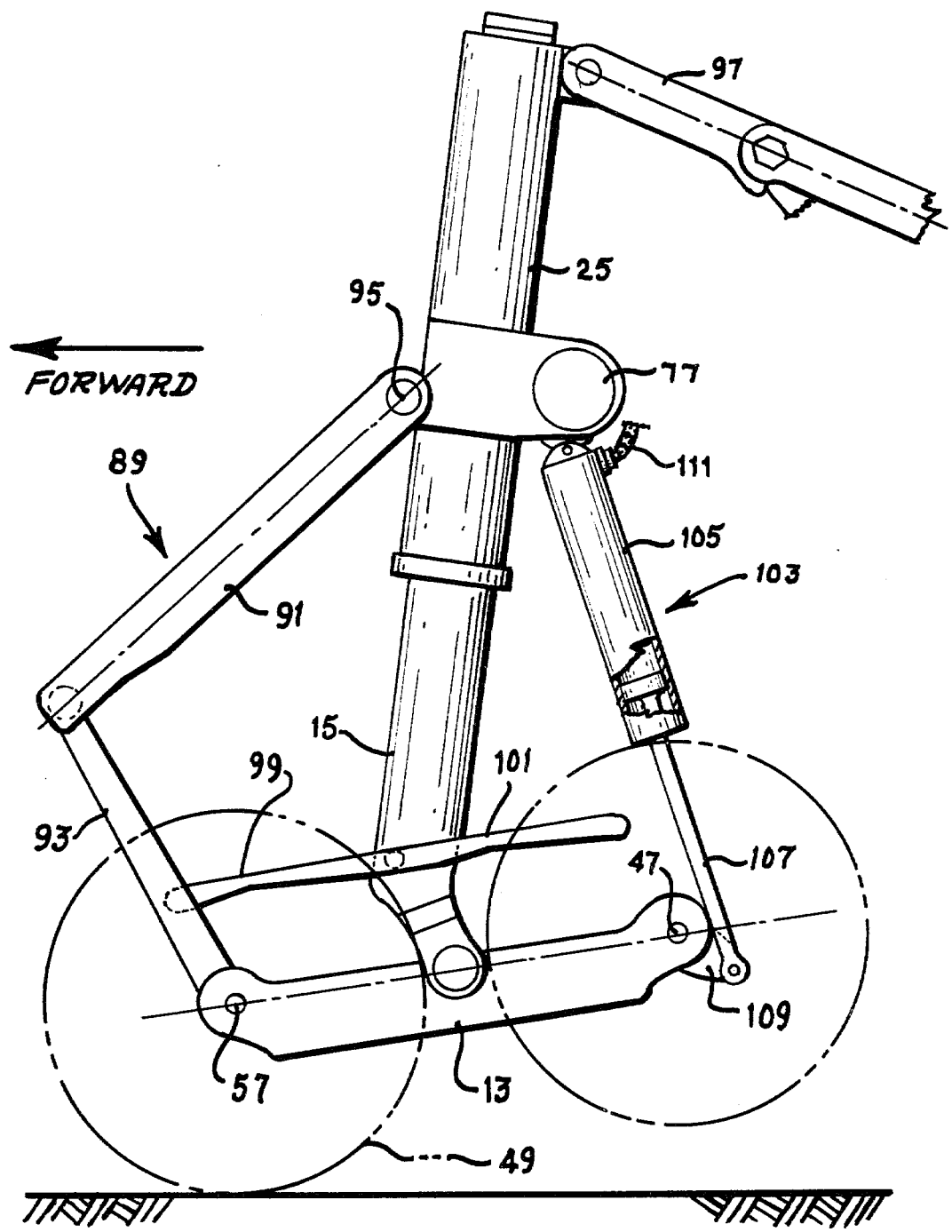
FIG. 4 is an enlarged view of still another embodiment of the invention showing the torque links on the front and an extension stop and damper on the rear for improving the taxi mode of the landing gear over rough terrain.

In FIG. 4, there is shown a soft landing gear which is suitable for use when traversing rough terrain. The arrangement is similar to the configuration shown and described in FIG. 3, except that an extension stop and damper 103 is positioned between the shock strut and the aft end of the bogie 13 in place of the soft landing links 73. The combination extension stop and hydraulic damper 103 includes an upper cylinder portion 105 and a lower piston/rod portion 107 which slides in the cylinder 105. The lower end of the piston/rod portion 107 is pivotally attached to a member 109 which in turn is structurally attached to the aft end of the bogie 13 at the axle of the aft wheel 47. The upper end of the cylinder portion 105 is pivotally attached to the trunnion 77 and an overflow and supply line 111 is operatively connected to the upper portion of the cylinder 105. All of the good features of the soft lander of FIG. 3 are retained while providing better rough terrain taxi capability by restraining bogie oscillations and preventing possible tire bottoming, especially on a step type bump at different levels.

In operation, the soft landing gear according to the invention shown in FIG. 2 includes a bogie type gear with short aft mounted torque links causing the bogie 13 to pitch downward so that the front tires contact the ground first. Until the aft wheels touch the ground, the bogie 13 tends to pivot about the joint at the junction of the bogie and the torque link assembly. This action provides the front wheels with an approximate 2 to 1 mechanical advantage over the compressing strut with the external vertical forces at the front axle reduced accordingly. When the aft wheels pick up ground loads, the torque links fold, causing the gear to revert to a conventional bogie. Also, spinning up the wheels half at a time instead of all at once further reduces drag on the airplane.

Although the invention has been illustrated in the foregoing specification in terms of preferred embodiments thereof, the invention is not limited to these embodiments or to the particular configurations shown and described. It will be apparent to those skilled in the landing gear art that certain changes, modifications and substitutions can be made with respect to the shape of the elements without departing from the true spirit and scope of the appended claims. It can be seen that the novel linkage arrangement which causes the front wheels to touch down first, reduces and directs the landing forces so as to minimize shock to the airplane. Also, aft mounted torque links are used to transmit torque as well as to position the bogie for landing and to operate as a tension member during the initial landing stroke. In another embodiment, a damper is used as a tension stop for soft landing and to dampen bogie motion over bumps. The torque links are separate for this last embodiment.

Having thus set forth the nature of our invention, what we claim as new and desire to secure by Letters Patent of the United States is:

1. A bogie type front wheel touch down landing gear for use on an aircraft to provide soft landing capability, said landing gear comprising a vertical shock strut extending downward from the aircraft, said shock strut having a fixed portion and a piston slidable therein and extending downward from said strut, a substantially horizontal elongated bogie pivotally attached near its longitudinal center to the lower end of said piston, an axle and wheel positioned at the forward and aft ends of said bogie and an aft mounted linkage means in the form of a pair of pivotally connected links for controlling the landing forces, one of the ends of said aft mounted linkage means being pivotally secured to said aft end of said bogie and the other end of said aft mounted linkage means being pivotally secured directly to the lower end of said fixed portion of said shock strut, said aft mounted linkage means being sized to cause the forward end of said bogie to pitch downward so that the forward wheel contacts the ground first to produce a force therethrough and a tension force in said aft mounted linkage means, the resultant force therebetween being an upward piston force acting straight up the strut with little bending and friction on the piston.

2. The bogie type landing gear for use on an aircraft to provide a soft landing capability as defined in claim 1 further comprising a torque linkage system, said torque linkage system being operably connected between said forward end of said bogie and said lower end of said fixed portion of said shock strut.

* * * * *